(12) United States Patent  
Croft (10) Patent No.: US 7,757,634 B2
(45) Date of Patent: Jul. 20, 2010

(54) MILK PUMP SYSTEM

(75) Inventor: Gordon James Croft, Tavistock (CA)

(73) Assignee: Fluid Transfer Systems Inc., Guelph (CA)

( * ) Notice: Subject to any disclaimer, the term of this patent is extended or adjusted under 35 U.S.C. 154(b) by 1049 days.

(21) Appl. No.: 11/375,204

(22) Filed: Mar. 15, 2006

(65) Prior Publication Data

US 2006/0207510 A1    Sep. 21, 2006

Related U.S. Application Data

(60) Provisional application No. 60/661,498, filed on Mar. 15, 2005.

(51) Int. Cl.
  *A01J 7/00* (2006.01)
(52) U.S. Cl. .................... 119/14.01; 119/14.42
(58) Field of Classification Search .............. 119/14.01, 119/14.18, 14.42
  See application file for complete search history.

(56) References Cited

U.S. PATENT DOCUMENTS 3,695,485 A * 10/1972 Littlejohn .................... 222/68
4,479,423 A * 10/1984 Schwitters et al. ............ 99/455
5,431,546 A *  7/1995 Rhoades ....................... 417/313
5,518,013 A *  5/1996 Mansur ..................... 134/56 R
5,531,240 A *  7/1996 Kelada ..................... 137/15.16
5,769,025 A *  6/1998 van der Lely et al. ..... 119/14.42
5,878,767 A *  3/1999 Etling et al. .............. 137/15.01
7,442,014 B1 * 10/2008 Mellinger et al. ......... 417/423.1
2005/0191184 A1 *  9/2005 Vinson ....................... 417/44.2

FOREIGN PATENT DOCUMENTS

CA     1284472     5/1991

* cited by examiner

*Primary Examiner*—Yvonne R. Abbott
(74) *Attorney, Agent, or Firm*—Jones, Tullar & Cooper, P.C.

(57) ABSTRACT

The invention relates to a system for transferring a liquid consumable product, such as milk, from a bulk storage tank to a transport vehicle receiving tank or from one bulk tank to another whether stationary or mobile. The system increases the efficiency with which the milk is transferred from the bulk tank to the transport vehicle by providing a centrifugal pump permanently positioned on the milk producer's premises proximal the bulk tank. The system includes an air-purge system for removing any residual milk from the pump and transfer lines once pumping has ceased, as well as a wash system for cleaning the pump system components after use. In addition to transferring milk from the bulk tank to the transport truck, the centrifugal pump is conveniently adaptable for use in the washing operations, thereby adding to the efficiency of the overall system.

11 Claims, 8 Drawing Sheets

MILK PUMP SYSTEM

CROSS-REFERENCE TO RELATED APPLICATION

This application claims the benefit of U.S. Provisional Patent Application Ser. No. 60/661,498 filed Mar. 15, 2005.

FIELD OF THE INVENTION

This invention relates to a system for transferring a liquid consumable product, such as milk, from a bulk storage tank to a transport vehicle receiving tank or transferring such liquid from one bulk tank to another, whether stationary or mobile.

BACKGROUND OF THE INVENTION

Raw milk is stored on dairy farms in milk holding tanks, or bulk tanks, until the milk is collected by a milk transport company and transported by truck to a dairy plant or the like. According to current practice, the transport trucks are equipped with a positive-displacement pump, which when coupled to the bulk tank, serves to transfer a quantity of milk from the bulk tank to the transport truck reservoir tank. The trucks are equipped with an appropriate sanitary hose having one end connected to the inlet of the positive-displacement pump, with the other end of the hose adapted to be coupled to the outlet of the bulk tank. According to the current set-up, the positive-displacement pump typically transfers milk from the bulk tank at an average rate of about 350 litres per minute. Once the appropriate quantity of milk has been transferred from the bulk tank, or the bulk tank has been emptied, the driver disconnects the hose and starts the bulk tank washer before leaving. The entire process usually takes about 35 minutes.

Due to changes in the dairy farming industry, the number of farms producing milk has been decreasing. However, the remaining farms are larger in size and produce a greater volume of milk. This trend is expected to continue with the number of farms further decreasing while the volume of milk produced by each farm increases. Therefore, the efficiency with which the driver or operator of the transport vehicle can transfer milk from the bulk storage tanks to the vehicle tank and begin the necessary sanitizing operations will become more important as the amount of milk stored on each farm increases.

U.S. Pat. No. 5,878,767 to Etling et al. discloses a system for transferring fluid from a filling reservoir to a receiving tank that substantially eliminates the escape of any residual fluid or any undesirable odours (if the fluid is odorous) from the fluid transfer lines when they are uncoupled from the tanks. The system includes a portable platform with a centrifugal pump mounted thereon which, when operated, induces fluid to travel from the filling reservoir to the receiving tank through the transfer lines. The system also includes a compressed gas source in communication with the fluid transfer line for blowing gas through the line to remove any residual fluid from the line, and provides for a vapour return line interconnecting the filling reservoir inlet and the receiving tank vent. The disclosed system mainly relates to the transfer of odorous chemicals, wherein the escape of any fluid or odour to the environment is undesirable. As well, the pump is used solely for selectively transferring fluid from one tank to another and is not adaptable for use in cleaning or sanitizing operations which are required when dealing with consumable products such as milk.

SUMMARY OF THE INVENTION

The present invention provides an improved system for transferring milk from the bulk storage tanks of a typical dairy farm to the milk transport vehicle which decreases the amount of time required to complete the transfer and sanitizing processes.

According to one aspect of the invention, there is provided a system for transferring milk from a bulk tank to a transport truck reservoir tank, the bulk tank having an outlet for discharging milk therefrom, and the reservoir tank having an inlet for permitting milk to enter the reservoir tank. The system comprises a centrifugal pump permanently positioned proximal to the bulk tank for inducing milk to travel from the bulk tank to the reservoir tank. A motor is operably connected to the pump for driving the pump in the milk transfer operation. A first milk transfer line for connecting the bulk tank outlet to the inlet of the pump is provided, and coupling means are provided at the outlet of the pump for receiving an end of a second milk transfer line. The second milk transfer line serves to interconnect the pump to the transport truck reservoir tank.

According to another aspect of the invention there is provided a system for transferring milk from a first bulk tank to a second bulk tank, the first bulk tank having an outlet for discharging milk therefrom, and the second bulk tank having an inlet for permitting milk to enter the second bulk tank. The system comprises a centrifugal pump permanently positioned proximal to the first tank for inducing milk to travel from the first bulk tank to the second bulk tank. A motor is operably connected to the pump for driving the pump in the milk transfer operation. A first milk transfer line for connecting the first bulk tank outlet to the inlet of the pump is provided, and coupling means are provided at the outlet of the pump for receiving an end of a second milk transfer line. The second milk transfer line serves to interconnect the pump to the second bulk tank.

BRIEF DESCRIPTION OF THE DRAWINGS

The present invention will be better understood with reference to the detailed description taken in combination with the drawings in which.

DETAILED DESCRIPTION OF THE PREFERRED EMBODIMENT

Figure 1:
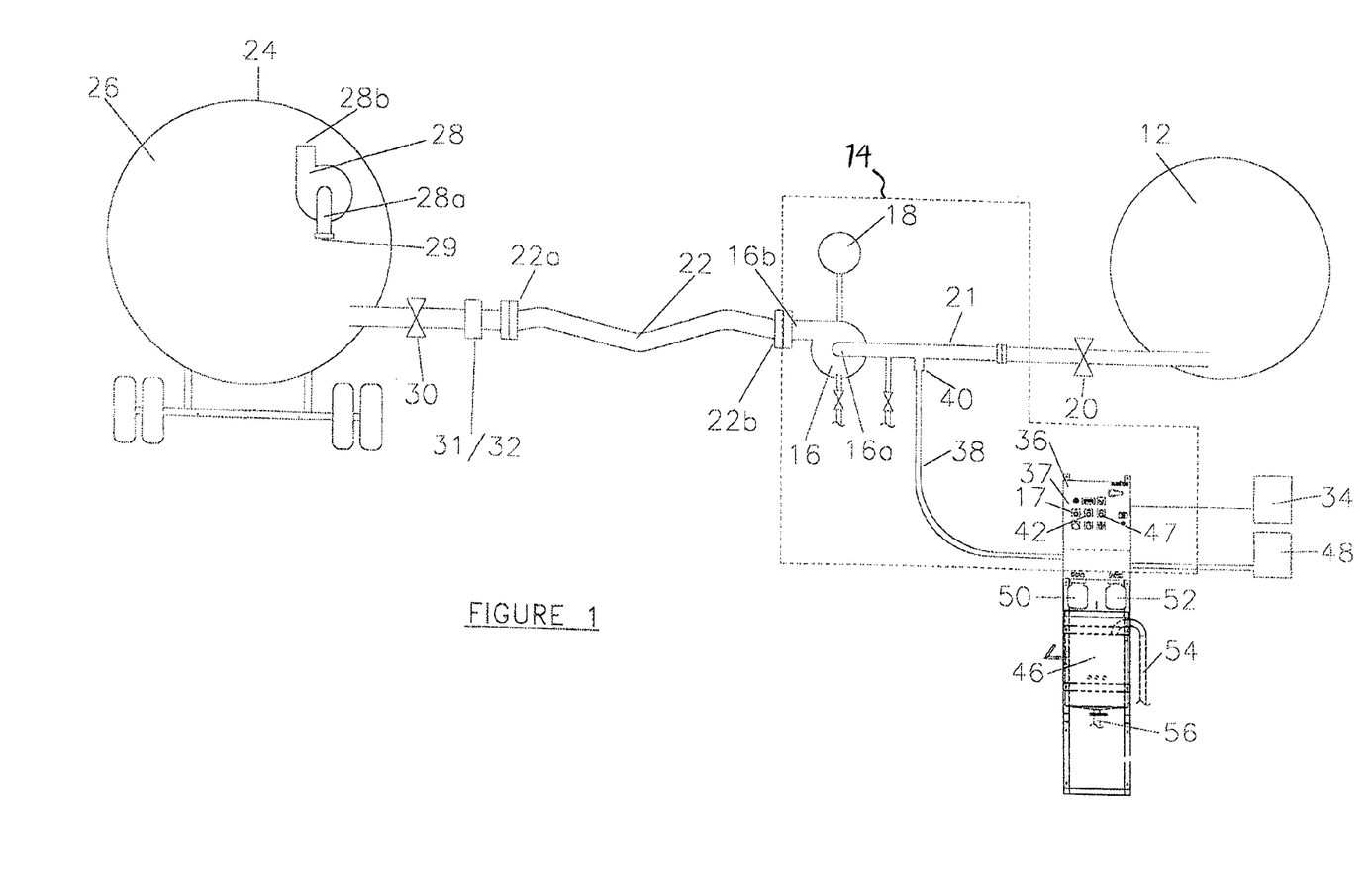
FIG. 1 is a schematic showing the milk pump system of the present invention.

Referring to the drawings, there is shown in FIG. 1 a schematic of the system according the present invention, which comprises bulk tank 12 and pump system 14 as outline in dotted lines in FIG. 1. The pump system 14 includes a centrifugal pump 16 driven by an appropriate electric motor 18. The centrifugal pump is located on the milk producer's premises proximal to the bulk tank 12. The size of the pump 16 and motor 18 are chosen based on the size of bulk tank 12, the hydro available at the farm and the desired pumping speed. For instance, single-phase farms are limited to 10 horsepower electric motors, as a 60 amp breaker is required for the system. Farms that are equipped with 3-phase hydro and 600 volts have more versatility; therefore the desired time for transferring the milk to the transport vehicle determines the size of pump and the horsepower of the motor. Typically, a 3 A centrifugal pump is sufficient to achieve the desired results. The pump inlet 16a is connected to the bulk tank outlet valve 20 with appropriate piping 21, preferably 304 stainless steel pipes. The pump outlet 16b is adapted for coupling with an end of a sanitary milk hose 22 from the milk transport truck 24. The transport truck 24 includes a reservoir tank 26 for receiving a quantity of milk from the milk producer.

Figure 2:
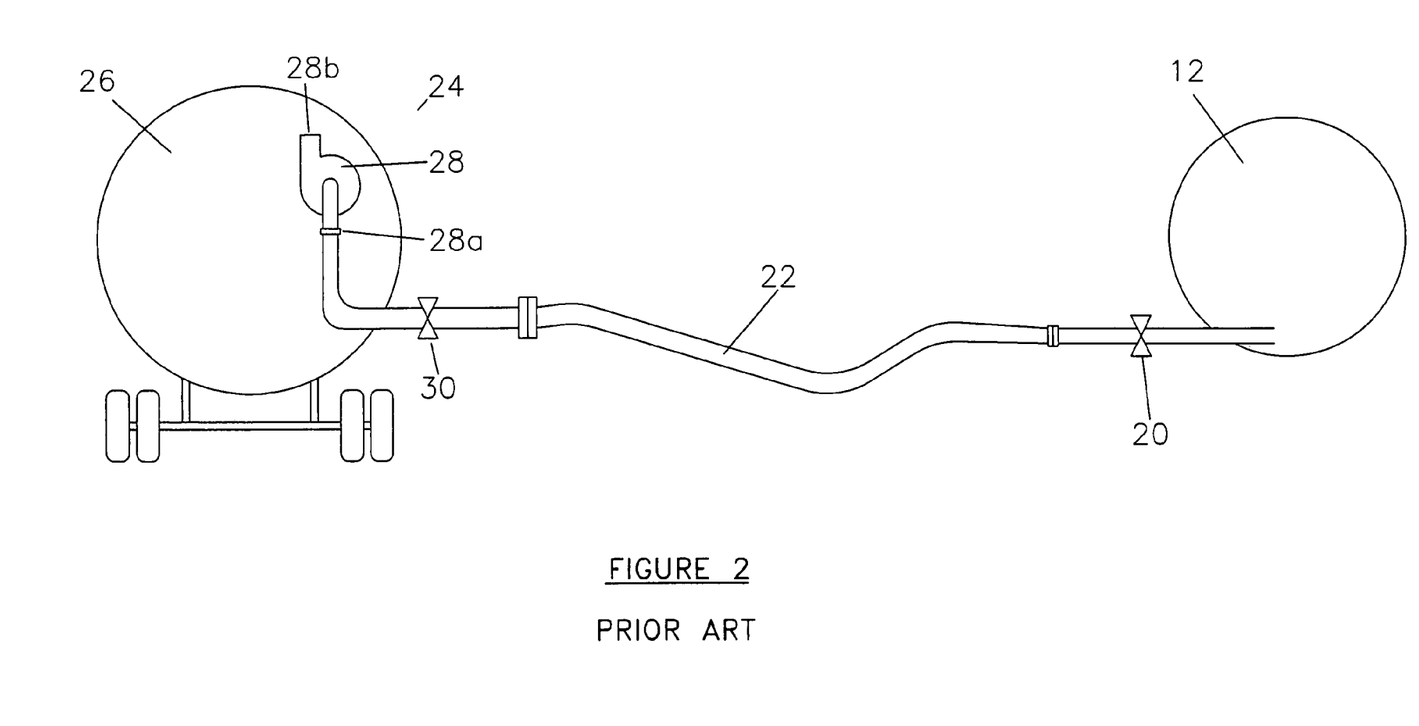
FIG. 2 is a schematic showing the prior art milk transfer system.

Currently, the typical transport truck 24 is equipped with a positive-displacement pump 28 for transferring milk from the producer's bulk tank 12 to the reservoir tank 26, as shown in FIG. 2. The inlet 28a of the pump 28 is connected to sump valve 30, which provides access to the truck reservoir tank 26, and the outlet 28b of the pump 28 opens into the tank 26. The sump valve 30, which allows fluid to enter the reservoir tank 26 when opened, is adapted to receive a first end of the sanitary milk hose 22. The distal or second end of the milk hose 22 is then connected to the outlet 20 of the milk producer's bulk tank 12. Once activated, the positive-displacement pump 28 pumps the milk from the bulk tank 12, through the sanitary hose 22 to the transport truck reservoir tank 26. However, as described above, the present invention makes use of a permanently positioned centrifugal pump 16 associated with the milk producer's bulk tank 12 which is more suited for efficiently transferring large quantities of fluid. Therefore, since the positive-displacement pump 28 located on the transport truck 24 is no longer required, the inlet 28a of the positive-displacement pump 28 is disconnected from the sump valve 30 and is capped-off with a cap plug 29 (see FIG. 1). With the inlet 28a to the positive-displacement pump 28 capped-off, the sump valve 30 acts as the inlet to the truck reservoir tank 26, by-passing the positive-displacement pump 28 altogether. Therefore, the transport truck 24 can be easily adapted for use with the system of the present invention without any significant modifications.

Figure 4:
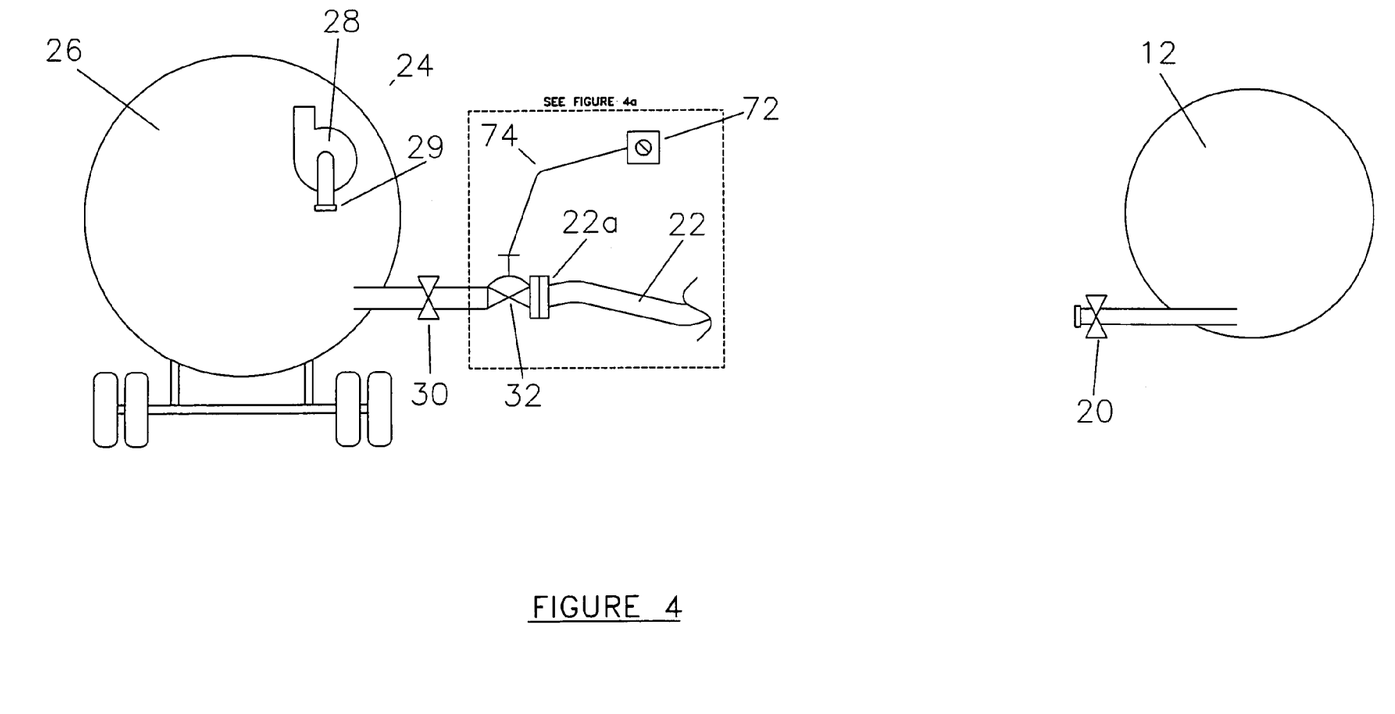
FIG. 4 is a schematic showing a preferred connection between the milk transfer truck and the milk hose using a valve/switch means of the present invention.
Figure 4A:
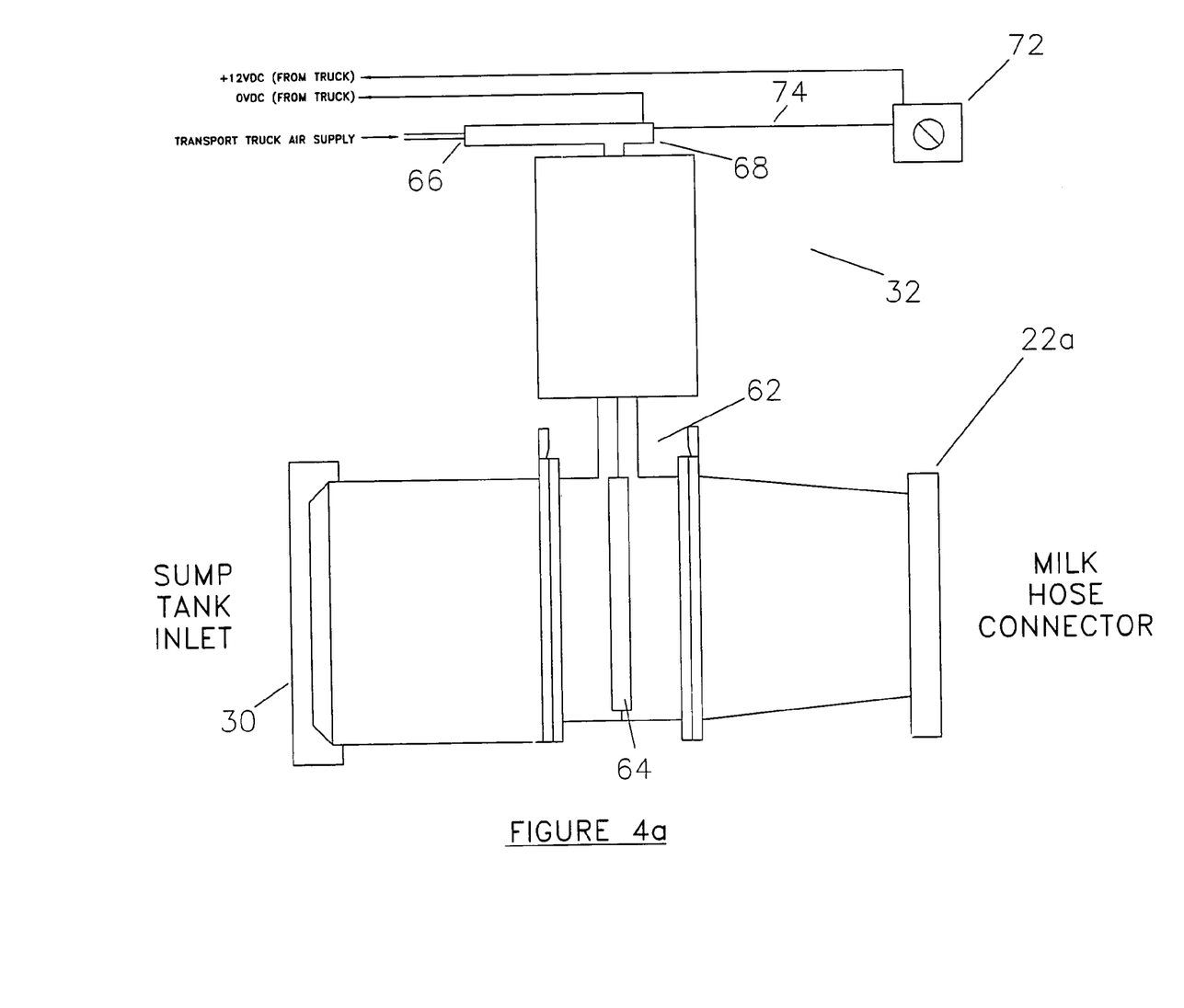
FIG. 4A is a detail schematic showing the valve/switch means of FIG. 4.

Once the positive-displacement pump 28 has been disconnected, the truck operator connects the first end 22a of the sanitary milk hose 22 to the sump valve 30. The sump valve 30 is opened, and should remain in an open condition. An adaptor 31 may be required intermediate the sump valve 30 and the milk hose end 22a to achieve a proper connection. Preferably, a custom-designed valve/switch means 32 is used, which is installed between the sump valve 30 and milk hose end 22a. The valve/switch means 32 includes a remote switch control on the end of an extension cord, which provides the operator with the convenience of effectively controlling the fluid access to the sump valve 30 when remote from the vehicle. The valve/switch means 32 is described in detail below in relation to FIGS. 4 and 4A.

With the first end 22a of the milk hose 22 in communication with sump valve 30 (by means of the adaptor 31 or valve/switch means 32), the distal or second end 22b of the milk hose is then coupled to the outlet 16b of the centrifugal pump 16. The pumping operation can then be started using the pump motor 18, fill truck PB 17, which are conveniently located in the milk house proximal to the bulk tank 12 and pump system 14. The motor controls are connected to the appropriate electrical components in control panel 36 to meet standard electrical code requirements, such as a circuit breaker and contactor box. Once the desired quantity of milk has been transferred, the bulk tank outlet 20 is closed and centrifugal pump 16 is switched off.

Before disconnecting the milk hose 22 from its couplings, the piping 21 and pump 16 must be cleared of residual milk that has collected in the lines. Therefore, the present invention further includes an air-purge system for delivering a blast of air to the lines, thereby clearing them of any pooled or residual milk. The air-purge system includes an air compressor 34 located in the producer's milk house. The air compressor 34 is connected to a control panel 36 where a relay and timer 37 control the flow of air through an air hose 38. The air hose 38 connects to an air-blow valve 40 located in piping 21. The air-purge operation is operated with control switch 42 which starts and stops the air flow. Typically, a 15 second air-purge operation is sufficient to clear the lines of any residual milk. Once the air-purge is complete, the truck operator closes sump valve 30 on the milk truck and disconnects the milk hose 22 from the outlet 16b of the centrifugal pump 16, and stores the milk hose 22 back on the transport truck 24. As well, a sanitary hose could also remain attached to outlet 16b with a cap at the end, and it would be washed by the system if chosen to do so.

Industry standards require that any component used in the milk transfer operation be washed and sterilized after use to avoid any possible contamination of the milk product traveling through the components during subsequent pumping operations. Accordingly, the present invention further includes a sanitizing or wash system 44 that conveniently operates using the same centrifugal pump 16 that is used during the pumping operation. A schematic of the preferred wash system 44 set-up is as outlined in dotted lines shown in FIG. 3.

Figure 3:
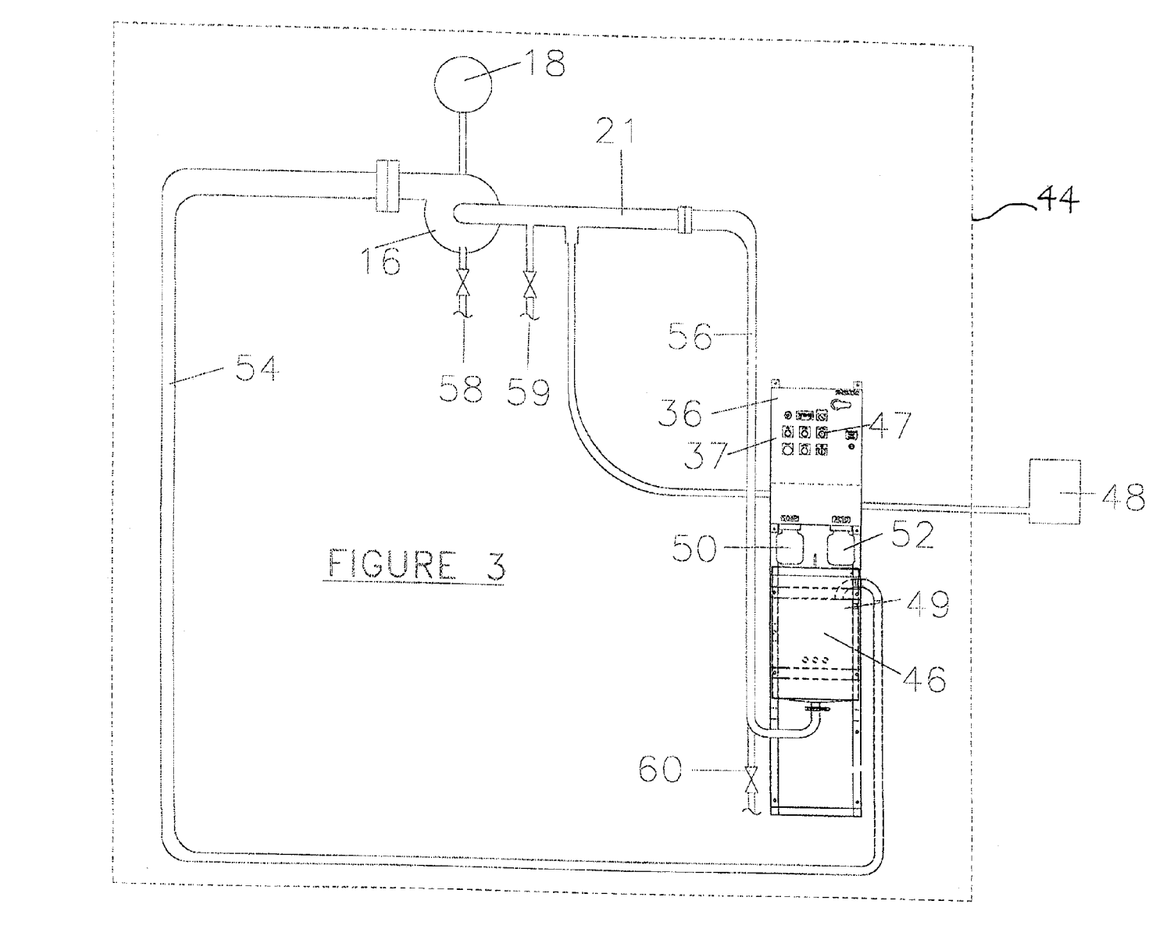
FIG. 3 is a schematic showing the wash system of the present invention.

The wash system 44 comprises a wash tank 46 operably connected to control panel 36. A potable water supply 48 is fed into wash tank 46 by means of the control panel 36. The control panel 36 also feeds a supply of detergent 50 and an acid solution 52 through the wash tank 46, at respective intervals, for the various wash cycles. Once the pumping and air purge operations are complete and the milk hose 22 has been removed from the pump, the truck operator connects the wash tank hoses to the pump system 14 equipment. The wash tank pressure line 54 is connected to the outlet 16b of the centrifugal pump 16, while the wash tank suction line 56 is connected to piping 21, which has been disconnected from the outlet 20 of the bulk tank 12.

The wash system 44 is activated by means of a switch 47 on the control panel 36. Once activated, the wash tank 46 fills with water from the potable water supply 48 until the water reaches a predetermined level, thereby activating a float valve 49 located in the wash tank 46. When the water reaches the float valve 49, the water supply 48 is shut-off and the timer 37, which has been set to a preferred wash-cycle time, begins running which in turn activates the centrifugal pump 16 in a reverse mode. With the centrifugal pump 16 operating in a reverse mode, wash water is forced through the wash tank pressure line 54, cycled through the centrifugal pump 16 and piping 21, and returned to the wash tank 46 via the wash tank suction line 56. The water cycle is followed by a detergent cycle, and finally an acid solution rinse cycle.

To facilitate the washing process, piping 21 and centrifugal pump 16 are each equipped with a drain valve so that the pump system 14 can be drained between each wash cycle.

Pump 16 has a drain valve 58 located at the lowest point on the pump, while piping 21 has a drain valve 59 located proximal to the inlet connection with the centrifugal pump 16. Pump drain valve 58 is, preferably, an air-operated pinch valve while drain valve 59 is, preferably, an air operated stainless steel butterfly valve. However, any suitable drain valve may be used for either application. An air eliminator valve 60 may also be incorporated in the wash tank suction line 56 to prevent the centrifugal pump 16 from air-locking during the wash cycles.

As described above, once the wash tank pressure line 54 and wash tank suction line 56 have been connected, the wash system control switch 47 is activated, thereby causing the wash tank 46 to fill with water. Once the water reaches the float valve 49 and the timer 37 starts running with pump 16 operating in reverse mode, the water is cycled through the pump 16 and piping 21 for the duration of the first rinse cycle (approximately 8 minutes). Once the first rinse cycle is finished, drain valves 58 and 59 are opened and the pump system 14 is drained of any residual rinse water. The detergent cycle and the acid solution rinse cycle operate in the same manner, with the cycle coming to an end, followed by a draining of the pump system 14. Once the wash operation is complete and the drain valves 58, 59 closed, the pump system 14 is ready for the next milk transfer operation.

Figure 5:
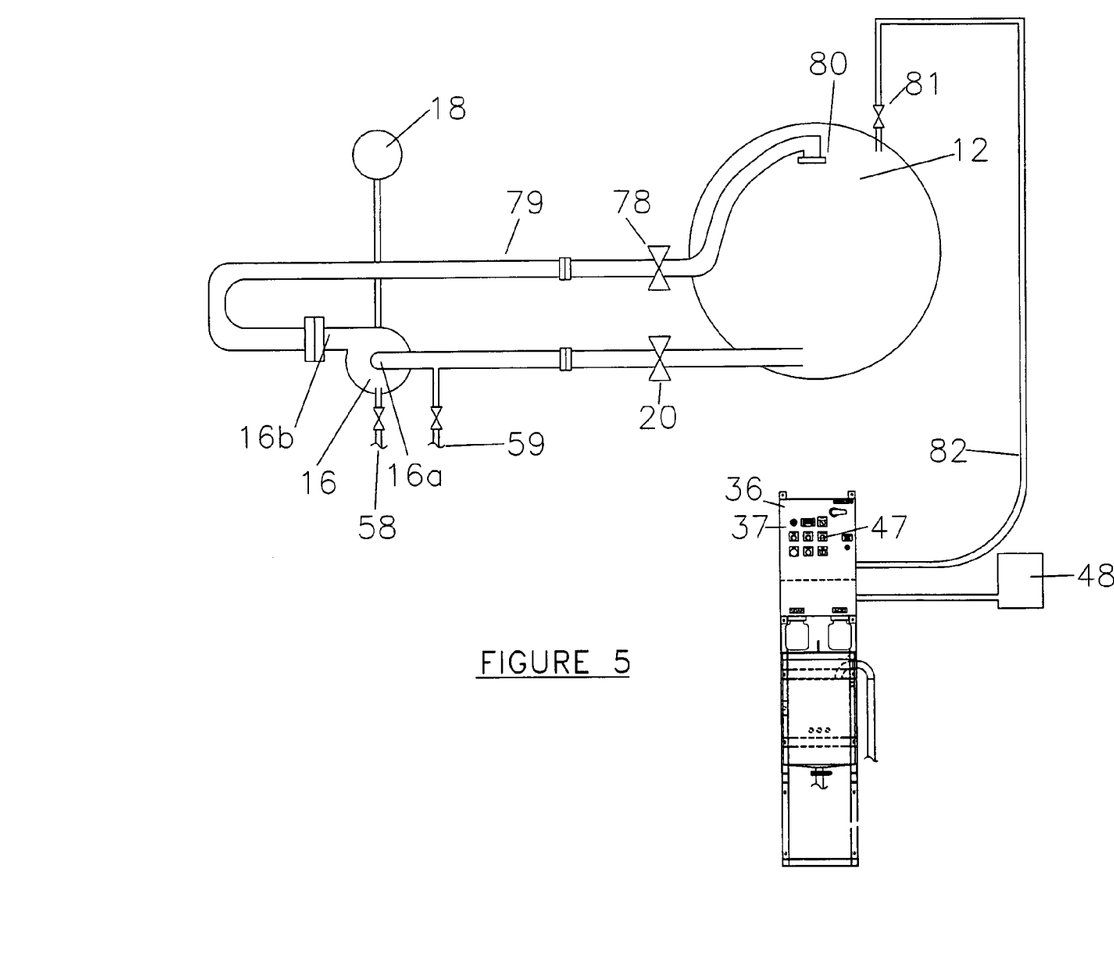
FIG. 5 is similar to FIG. 3 and shows the wash system in use for washing the bulk milk tank itself.

While the wash system 44 is used primarily to clean the pump 16 and associated piping 21, the pump 16 can also be used to wash the bulk tank 12, once it has been emptied of all its contents. As shown in FIG. 5, the pump/bulk tank wash system makes use of centrifugal pump 16 and piping 21 which connects the outlet 20 of the bulk tank 12 to the inlet 16a of the pump 16. Therefore, the washing of the pump system components and the washing of the bulk tank 12 are incorporated into one wash system. The outlet 16b of the pump is connected to a wash inlet 78 on the bulk tank 12 by means of a wash hose 79. The wash inlet 78 connects to a shower-head spray ball 80 located within the bulk tank, as is common with standard bulk tank wash systems.

In this embodiment, the potable water supply 48 is metered through control panel 36 and fed directly into bulk tank 12 through bulk tank inlet 81 by means of a supply hose 82. A timer and relay control the operation of pump 16. Therefore, once the pump/bulk tank wash system is started, a predetermined quantity of wash water from the potable water supply 48 is fed into bulk tank 12. Once the bulk tank is filled with an appropriate amount of wash water, the pump 16 is turned on and circulates the wash water through the pump system components and the bulk tank. Once the wash cycle is finished, the system is drained by means of drain valves 58, 59 in the pump 16 and piping 21 respectively. The pump/bulk tank wash system not only eliminates the need for a secondary wash pump associated with the bulk tank 12, but also eliminates the need for a separate wash tank 46, as depicted in FIG. 1, and additional wash hoses or conduits 54, 56.

As mentioned above, the milk transfer operation of the present invention is facilitated by the use of the specially designed valve/switch means (or Ashley valve) 32 (see FIGS. 4 and 4A), which is preferably used to connect the first end 22a of the milk hose 22 to the sump valve 30 on the transport truck reservoir tank 26. The valve/switch means 32 comprises a housing 62 having one end adapted for connecting to sump valve 30, and an opposite end for receiving the first end 22a of the milk hose 22. The valve/switch means 32 is therefore connected in series between the sump valve 30 and milk hose 22. An air-actuated butterfly valve 64 is mounted in valve housing 62, and a 12-volt normally open air solenoid 66 is operably connected to the butterfly valve's air inlet 68. Preferably, butterfly valve 64 is a 3" 304 stainless steel normally closed valve. The valve's air inlet 68 is connected to the transport truck 24 air system (not shown) and the solenoid 66 is connected to a voltage source in the transport truck 24, such as to the compartment light or to the tail-light circuit. The power drawn from the truck goes through a single-pole, single-throw toggle switch 72 attached to an end of an extension cord 74 (approximately 30 feet in length), allowing the driver to operate the valve/switch means 32 remote from the vehicle 24. Since the sump valve 30 is opened at the beginning of the pumping operation and remains in the open condition, the valve/switch means 32 controls fluid access to the reservoir tank 26. When the valve/switch means 32 is closed, fluid cannot access the reservoir tank 26. When the valve/switch means 32 is opened, fluid can flow into the reservoir tank 26 through sump valve 30. Therefore, valve/switch means 32 allows the truck operator to effectively control the flow of fluid into the reservoir tank 26 without ever leaving the producer's milk house. This facilitates the pumping process for the milk truck operator, since the operator can open or close the valve to the truck reservoir tank 26 without having to walk back and forth between the milk house and the transport truck 24 during the different stages of the milk transfer operation, thereby increasing the overall efficiency of the milk transfer operation.

As indicated previously, the present invention is not restricted to the transfer of milk between a stationary tank and a mobile tank carried by an appropriate vehicle. The system of this invention could also be used for transferring milk, or any other fluid for that matter, between stationary tanks at the dairy farm or elsewhere. The system would use the components described above for the transfer of milk from, say, a small first bulk tank within the confines of a dairy barn to a second, larger, bulk tank such as a holding tank, located exterior to the dairy barn and from which a large volume of milk could be transferred to the mobile reservoir tank. The system could also be used for transferring milk between transport vehicles, possibly of different sizes. By effecting the transfer at a fixed location, such as a dairy farm, it is possible to transfer the milk at a much greater flow rate than can be accomplished using standard pumps as currently utilized on milk transport vehicles.

Figure 6:
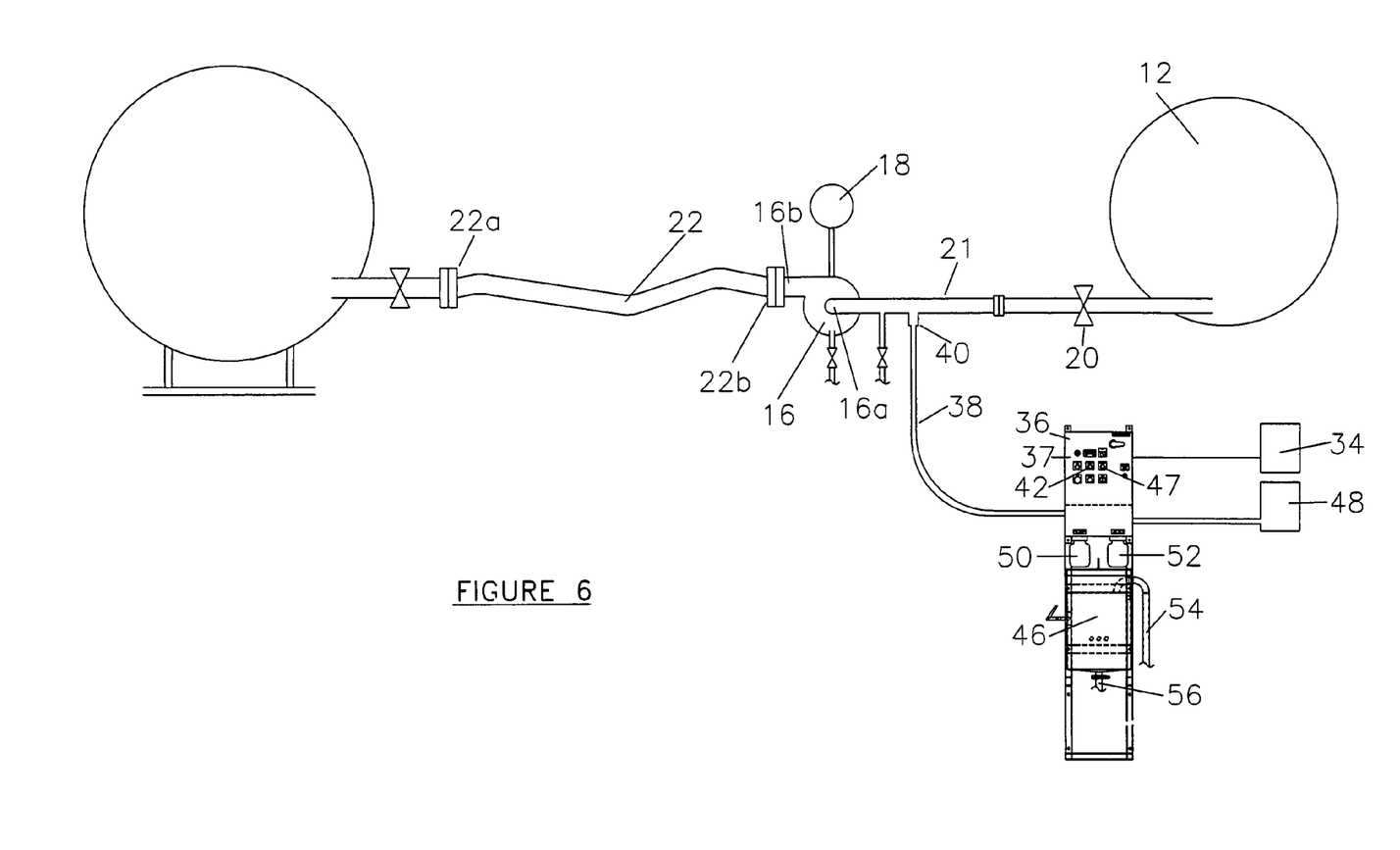
FIG. 6 schematically illustrates the system of the invention in use for the transfer of milk between large and small tanks.
Figure 7:
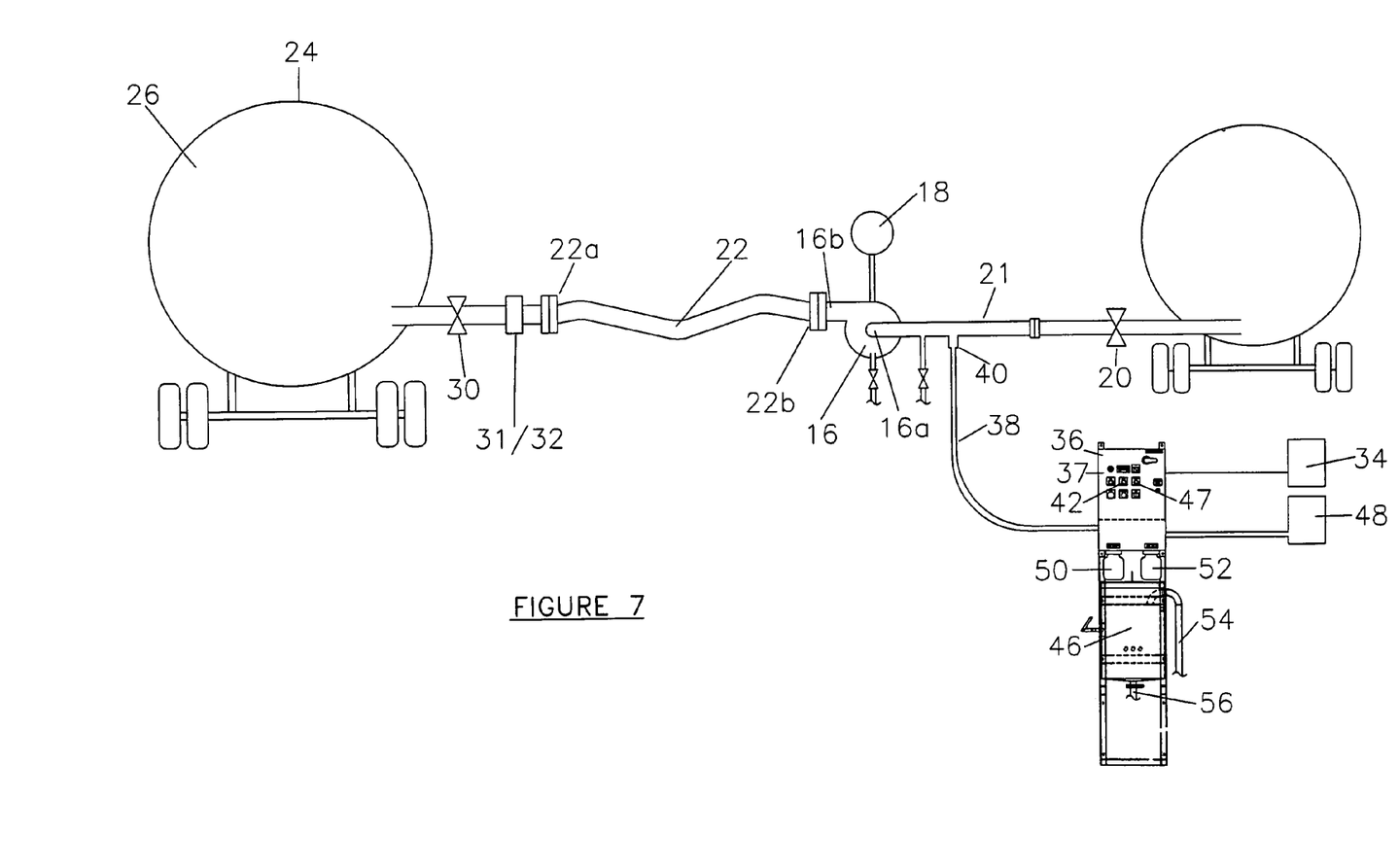
FIG. 7 schematically illustrates the system of the invention in use for the transfer of milk between large and small trucks

FIG. 6 illustrates an embodiment wherein the transport vehicle 24 is replaced by a large storage tank 12' whereas FIG. 7 illustrates an embodiment wherein the storage or bulk tank 12 is replaced by another transport vehicle 24". In these embodiments the stationary and movable tanks between which milk or other fluid can be moved are illustrated as being of different sizes. Of course, size is not a particular consideration in the transfer operation.

While the present invention has been described with respect to certain preferred embodiments, it will be understood by persons skilled in the art that variations or modifications can be made without departing from the scope of the invention as described herein.

What is claimed is:

1. A system for transferring milk from a bulk tank to a transport truck reservoir tank, the bulk tank having an outlet for discharging milk therefrom and the reservoir tank having an inlet for permitting milk to enter the reservoir tank, the system comprising:

a centrifugal pump permanently positioned proximal to the bulk tank for inducing milk to travel from the bulk tank to the reservoir tank, said pump having an inlet and an outlet;

a motor operably connected to said pump for driving said pump;

a first milk transfer line for connecting the bulk tank outlet to the inlet of said pump;

coupling means provided at the outlet of said pump for receiving an end of a second milk transfer line, said second milk transfer line interconnecting said pump to the reservoir tank; and a valve/switch means for opening and closing access to the reservoir tank remote from the transport truck, the valve/switch means including:

a housing;

a first end of said housing being connectable with the inlet of the reservoir tank;

a second end of said housing for receiving an end of said second milk transfer line;

an air-actuated butterfly valve located in said housing intermediate said first and second ends;

an air-operated solenoid operably connected to said butterfly valve; and a single-throw toggle switch operably connected to said solenoid for providing remote control of the butterfly valve.

2. The system of claim 1, further comprising a compressed air source in communication with said first milk transfer line for providing a blast of air to purge the system of residual milk that may collect in the pump or milk transfer lines.

3. The system of claim 1, further comprising a wash system for cleaning said pump and said first milk transfer line after the milk transfer operation is complete, said wash system comprising:

a wash tank for receiving a predetermined amount of a cleaning fluid selected from the group consisting of potable water, liquid detergent and an acid solution;

a wash tank pressure line connecting said wash tank to the outlet of said pump for delivering said cleaning fluid to said pump and to said first milk transfer line; and a wash tank suction line connectable with said first milk transfer line and said wash tank for returning said cleaning fluid to said wash tank as it is cycled through said pump and first milk transfer line.

4. The system of claim 3, wherein said pump and said first milk transfer line each include a drain valve for allowing excess cleaning fluid to drain therefrom.

5. A system for transferring fluid from a first bulk tank to a second bulk tank, the first bulk tank having an outlet for discharging fluid therefrom and the second bulk tank having an inlet for permitting fluid to enter the second bulk tank, the system comprising:

a centrifugal pump permanently positioned proximal to the first bulk tank for inducing fluid to travel from the first bulk tank to the second bulk tank, said pump having an inlet and an outlet;

a motor operably connected to said pump for driving said pump;

a first fluid transfer line for connecting the first bulk tank outlet to the inlet of said pump;

coupling means provided at the outlet of said pump for receiving an end of a second fluid transfer line, said second fluid transfer line interconnecting said pump to the second bulk tank; and a valve/switch means for opening and closing access to the second bulk tank remote from the second bulk tank, the valve/switch means including:

a housing;

a first end of said housing being connectable with the inlet of the second bulk tank;

a second end of said housing for receiving an end of said second fluid transfer line;

an air-actuated butterfly valve located in said housing intermediate said first and second ends;

an air-operated solenoid operably connected to said butterfly valve; and a single-throw toggle switch operably connected to said solenoid for providing remote control of the butterfly valve.

6. The system of claim 5 wherein said first bulk tank is stationary and said second bulk tank is associated with a fluid transport vehicle.

7. The system of claim 5 wherein each of said first and second bulk tanks is stationary.

8. The system of claim 5 wherein each of said first and second bulk tanks is associated with an individual fluid transport vehicle.

9. The system of claim 5 wherein said fluid is milk.

10. The system of claim 5, further comprising a wash system for cleaning said first bulk tank after the fluid transfer operation is complete, said wash system comprising:

a wash tank for receiving a predetermined amount of potable water;

means for metering a predetermined quantity of such potable water to said first bulk tank;

a wash hose connecting the outlet of said pump with a wash inlet on said first bulk tank for circulating said predetermined quantity of potable water from said first bulk tank, through said first fluid transfer line, said pump and said wash hose; and drain means for draining said pump and said first fluid transfer line following completion of a wash cycle.

11. The system of claim 10 wherein said metering means is connected to said wash tank and to an inlet to said first bulk tank, said metering means controlling the flow of potable water from said wash tank to said first bulk tank.

* * * * *